United States Patent [19]

Ban et al.

[11] Patent Number: 4,546,294
[45] Date of Patent: Oct. 8, 1985

[54] APPARATUS FOR REMOVING TORQUE RIPPLES IN A DIRECT CURRENT MOTOR

[76] Inventors: Itsuki Ban, 3-50-18, Higashi Oizumi Nerima-ku, Tokyo; Akihiro Nakajima, 9-8 Ichibayamatocho, Tsurumi, Yokohama, Kanagawa, both of Japan

[21] Appl. No.: 699,482

[22] Filed: Feb. 6, 1985

Related U.S. Application Data

[63] Continuation of Ser. No. 360,439, Mar. 22, 1982, abandoned.

[30] Foreign Application Priority Data

| Mar. 26, 1981 [JP] | Japan | 56-43201 |
| Apr. 1, 1981 [JP] | Japan | 56-47238 |
| Apr. 30, 1981 [JP] | Japan | 56-64282 |

[51] Int. Cl.⁴ .................................... H02K 29/00
[52] U.S. Cl. .................................... 318/311; 318/138; 318/254; 318/318; 318/439
[58] Field of Search ............... 318/138, 254, 311, 318, 318/331, 439, 345 CA

[56] References Cited

U.S. PATENT DOCUMENTS

| 3,475,672 | 10/1969 | Oltendorf | 318/331 X |
| 3,775,648 | 11/1973 | Brown et al. | 318/254 X |
| 3,924,166 | 12/1975 | Doemen | 318/331 X |
| 4,317,072 | 2/1982 | Goof et al. | 318/254 X |
| 4,382,214 | 5/1983 | Ban et al. | 318/254 |
| 4,396,875 | 8/1983 | Yamauchi | 318/254 |
| 4,405,885 | 9/1983 | Okamoto | 318/254 |
| 4,412,159 | 10/1983 | Uzuka | 318/254 |
| 4,415,844 | 11/1983 | Mendenhall et al. | 318/254 |
| 4,460,856 | 7/1984 | Mizumoto | 318/254 |

Primary Examiner—William M. Shoop, Jr.
Assistant Examiner—Shik Luen Paul Ip
Attorney, Agent, or Firm—Pahl, Lorusso & Loud

[57] ABSTRACT

An apparatus for removing torque ripples comprises a permanent magnet rotor, position sensors, stator armature coils, an operational circuit for effecting an arithmetic operation on detected signals from the position sensors, and a control circuit for driving the stator armature coils. According to another embodiment, an apparatus for removing torque ripples includes a direct-current motor having Y-connected armature coils, a detector for detecting counterelectromotive forces in the direct-current motor, an operational circuit for effecting an arithmetic operation on output signals from the detector, and a transistor for driving the direct-current motor.

3 Claims, 19 Drawing Figures

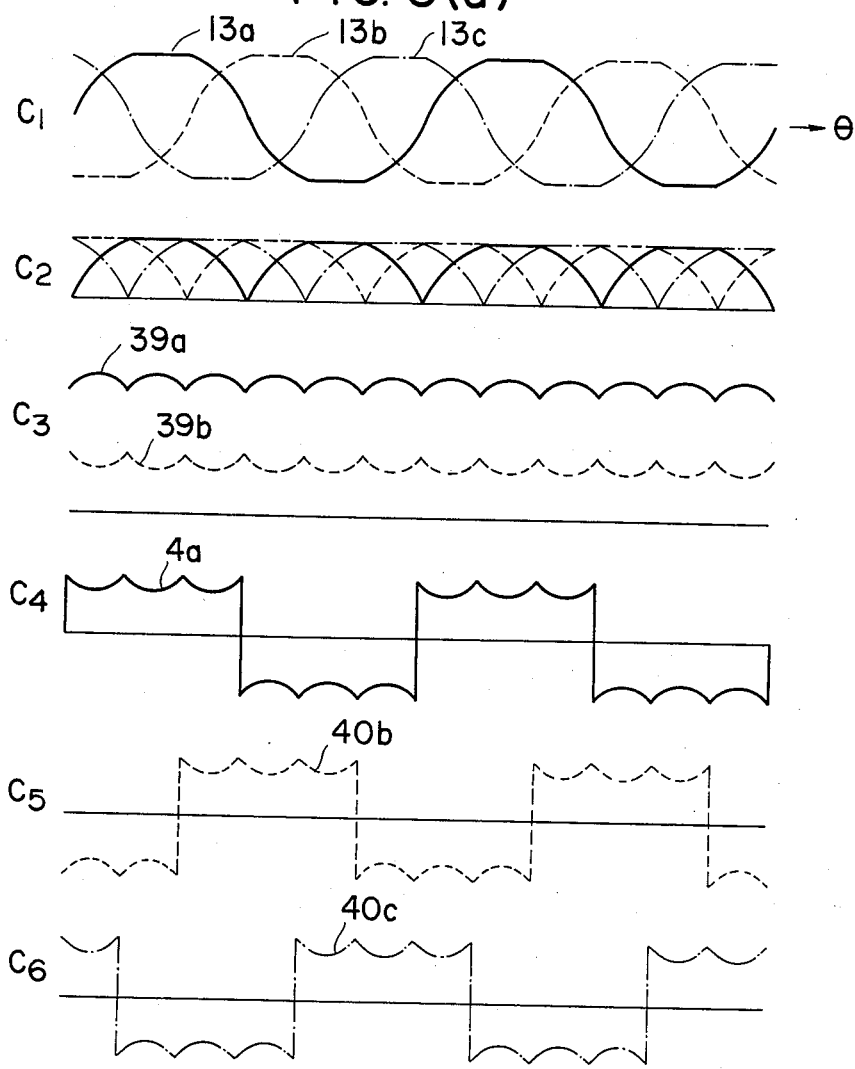
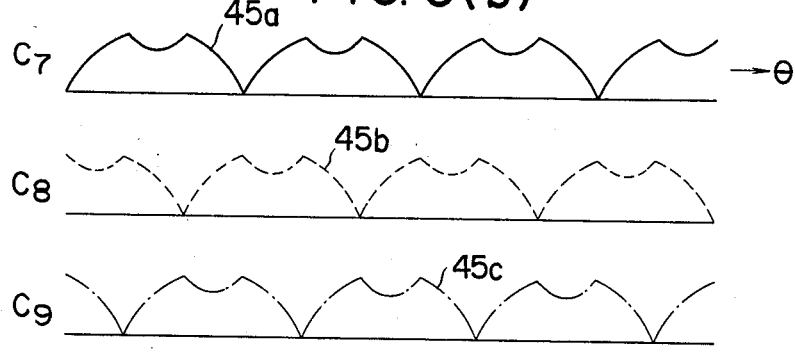

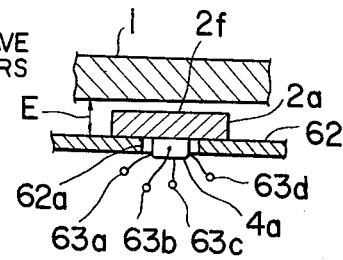
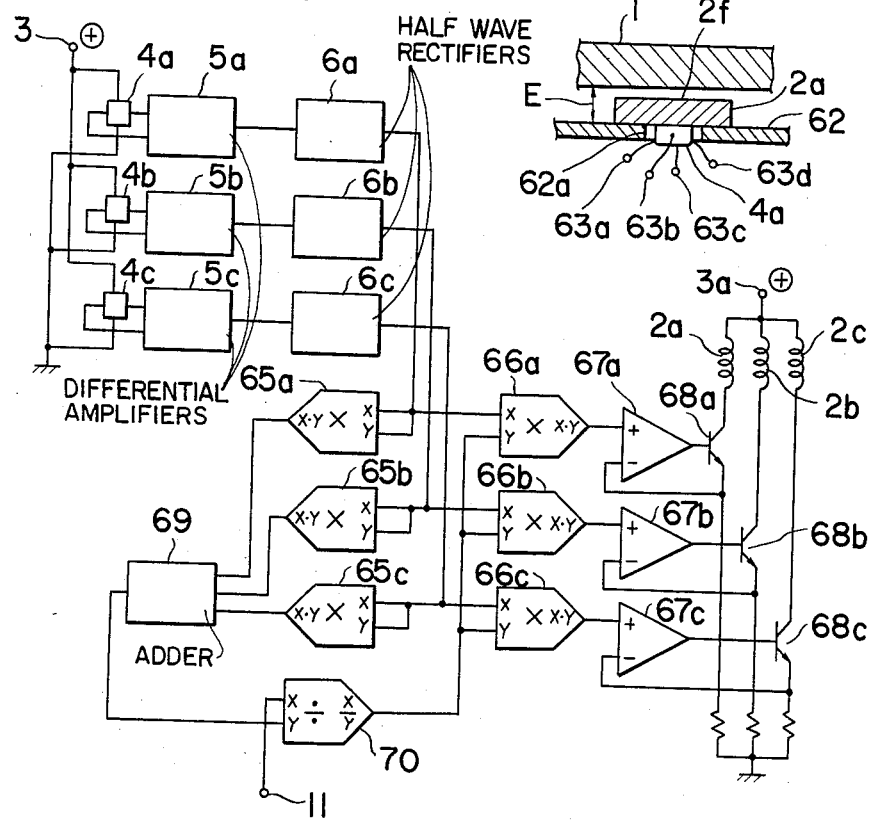
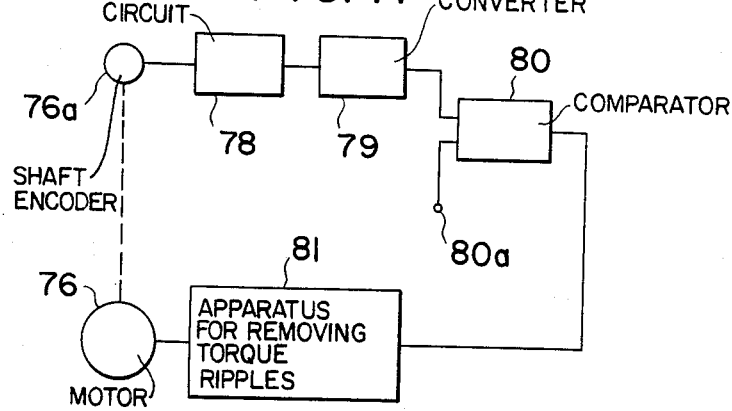

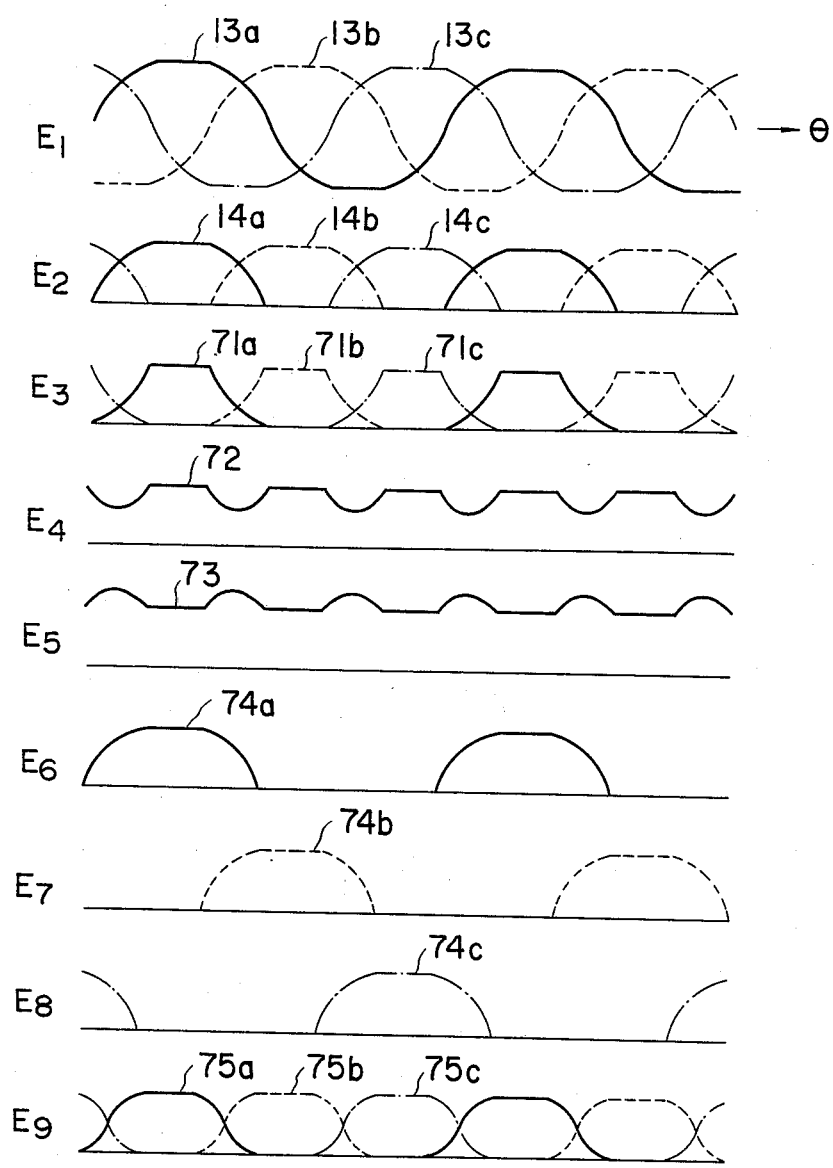

APPARATUS FOR REMOVING TORQUE RIPPLES IN A DIRECT CURRENT MOTOR

This application is a continuation of Ser. No. 360,439, filed 3/22/82, now abandoned.

BACKGROUND OF THE INVENTION

The present invention relates to a direct-current motor, and more particularly to an apparatus for removing torque ripples in a direct-current motor.

Torque ripples, which are indicative of periodic variations in the output torque of a direct-current motor while the latter makes one revolution, become larger the smaller the number of phases of armature coils is. Direct-current motors which are normally found in audio equipment are mostly of two phases or three phases, and hence undergo greater output torque variations or torque ripples.

Where such motors are used on cassette tape recorders, turntables, or videotape recorders, reproduced sounds tend to be distorted to a large degree as these devices are quite susceptible to wow and flutter. Use of flywheels to eliminate distortions in sound reproduction fails to achieve complete removal of speed variations. The flywheels render the overall apparatus relatively large and heavy.

Various means for controlling direct-current motors to rotate at constant speeds are known. One such means comprises a shaft encoder for improving the responsiveness of an output with respect to speed variations. With the shaft encoder incorporated, however, improved sound reproduction cannot be accomplished because of limitations on removal of speed variations due to torque ripples. Furthermore, an increased number of manufacturing steps are required to equip direct-current motors with shaft encoders, resulting in a poor rate of mass production. Another constant-speed control means comprises an electrical circuit which is less costly and needs no additional mechanism. Such an electrical circuit is generally in the form of a bridge servo circuit which is widely used to remove wow and flutter. The electrical control means, however, suffers two major difficulties. First, improved constant-speed performance requires fine adjustment of various constants of the circuit, with a resulting increase in the number of manufacturing steps. Secondly, torque ripples remain unremoved as they are, and serve as a source of variations in the speed of rotation of a capstan and hence wow and flutter.

Where the take-up reel of a cassette deck is driven by a direct-current motor during the mode of sound reproduction, the following two requirements must be met: The first requirement is that a magnetic tape to be wound up be kept under constant tension. If the tension that the tape is subjected to varied, the amount of slippage between a capstan and a pinch roller would change, so that the speed of travel of the tape would undergo variations. With conventional systems, the drive motor is supplied with a constant current only, and hence produces a constant torque. Since the diameter of the coiled magnetic tape is larger when the magnetic tape is fully wound up than when the magnetic tape starts being wound, the magnetic tape is tensioned to varying degrees while the tape is being wound on the take-up reel, with the result that the speed of travel of the magnetic tape will vary. The second requirement is removal of torque ripples. The direct-current motor for driving the take-up reel has armature coils of two or three phases, which contribute to generation of torque ripples that amount to 20%–30% of the drive torque. Such large torque ripples cause the magnetic tape to run at different speeds, which are a primary cause of wow and flutter.

In order to reduce wow and flutter to a range of 0.03% or less in WRMS, it is necessary to lower torque ripples down to about 1%, which has been found by actual measurements. Since it is difficult to gain such a value of torque ripples, a friction mechanism such as a felt member is generally used to remove torque ripples. This mechanism is however disadvantageous in that its ripple filtering action is unstable and the mechanism fails to work when it gets worn out. In addition, the friction machanism should be accompanied by another mechanism for disengaging the felt member during the fast-forward mode to keep the felt member from being adversely affected by large power transmission from the source of drive or the motor.

When direct-current motors are used as servomotors, servo characteristics are rendered uneven by variations in the output torque.

With a view to removing torque ripples and uniformizing a combined torque, it has been proposed as disclosed in Japanese Unexamined Patent Publication No. 54-68914 to magnetize a permanent magnet rotor in the pattern of a sine wave and to supply a stator armature coil with a sinusoidal current through a position sensor for producing a sinusoidal output indicative of an angular position of the rotor. According to the proposed technique, it is quite difficult to magnetize the rotor in the pattern of a sine wave.

SUMMARY OF THE INVENTION

The above-described drawbacks in the prior art apparatus have been successfully eliminated by the present invention.

Accordingly, it is a primary object of the present invention to provide a motor for producing an uniform output torque with torque ripples removed therefrom, that is, with its output torque curve rendered flatwise.

Another object of the present invention is to provide a motor which will be subjected to torque ripples in the amount of about 1% which is much smaller than those of conventional motors which have been in the amount of 20%–30%.

Still another object of the present invention is to provide a motor which will prevent wow and flutter from being produced even when the motor undergoes constant-speed control with poor responsiveness.

Still another object of the present invention is to provide a motor having an inexpensive and simple means for constant speed control of the motor.

A still further object of the present invention is to provide a d-c motor which is free of the prior difficulties and is small in size and less costly, the d-c motor being constructed simply by adding a control circuit to an ordinary direct-current motor.

A still further object of the present invention is to provide a d-c motor which can advantageously be constructed as a semiconductor motor or a commutator motor having known two-phase or three-phase armature coils, and which can more advantageously be constructed as a Y-connected direct-current motor having three-phase armature coils.

These and other objects of the present invention will become apparent from the following description of embodiments thereof when taken together with the drawings.

BRIEF DESCRIPTION OF THE DRAWINGS

FIGS. 5(a) and 5(b) are timing charts for voltages and currents in the control circuit illustrated in FIG. 4;

FIG. 8 is a fragmentary cross-sectional view of a semiconductor motor according to the present invention;

FIG. 9 is a circuit diagram, partly in block form, of an energization control circuit in an apparatus according to a still further embodiment of the present invention;

FIG. 10 is a timing chart for voltages and currents in the control circuit shown in FIG. 9;

FIG. 11 is a block diagram of an electrical circuit for effecting constant-speed control of a motor;

DESCRIPTION OF THE PREFERRED EMBODIMENTS

Figure 1:
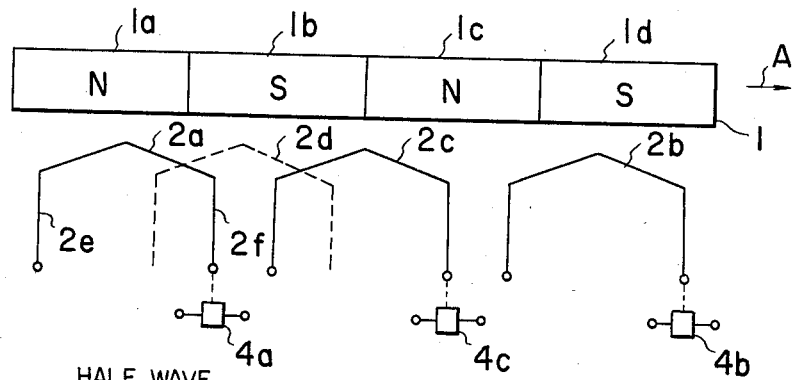
FIG. 1 is a developed diagram of the armature coils and magnet rotor of a semiconductor motor to which the present invention is applied.

FIG. 1 shows, in a developed diagram, a semiconductor motor of the coreless type comprising a magnet rotor 1 serving as a field system and armature coils (three phases). Such a semiconductor motor is disclosed in Japanese Unexamined Patent Publication No. 54-86711. The armature may be either disc-shaped or cup-shaped. A semiconductor having a core may be used which includes provision for eliminating cogging. The field system includes four rotor magnets 1a, 1b, 1c and 1d that are angularly spaced at 90-degree intervals, the magnets 1a and 1c being north-seeking poles and the magnets 1b and 1d being south-seeking poles.

The armature coils are three in number and denoted by 2a, 2b and 2c, respectively. Each armature coil has conductors 2e, 2f which are effective for generating a torque, the conductors being spaced from each other by a distance that is equal to the width of each magnetic pole of the field system. The armature coils 2a, 2b and 2c are in the form of three-phase lap windings. Overlapped portions of the armature coils 2a, 2b and 2c should be eliminated so as to reduce an air gap between the magnet rotor 1 and a yoke (not shown) of a mild steel plate for an increased magnetic field. To this end, an armature coil 2d, shown in a dotted line, which would otherwise be located as shown, is displaced to the illustrated position of the armature coil 2b in which it is disposed in phase with respect to the magnetic field generated.

Hall effect devices 4a, 4b and 4c which serve as position sensors are fixed in alignment with conductors of the armature coils, respectively. The armature coil 2a is energized in response to outputs from lateral terminals of the Hall effect device 4a, and the armature coils 2b, 2c are controlled for their energization in response to outputs from lateral terminals of the Hall effect devices 4b 4c, respectively, thereby producing a driving torque on the magnet rotor 1 in the direction of the arrow A.

FIG. 8 illustrates a portion of the motor described above. The field magnet which serves as the rotor is denoted at 1, and a yoke 62 in the form of a mild steel plate is fixed to a body in confronting relation to the field magnet 1. In case the motor is used as a motor for driving the capstan of a cassette deck, a deck plate made of mild steel doubles as the yoke 62. The armature coil 2a which is wound in the form of a sector is fixedly mounted on the yoke 62 at a predetermined position thereon. Designated at 2f is the cross section of a conductor of the armature 2a which is effective for torque generation. The yoke 62 has a through hole 62a therein below the conductor 2f of the armature coil 2a. The Hall effect device 4a is disposed in the hole 62a. The Hall effect device 4a has terminals 63a, 63d for producing a Hall output in response to a magnetic field applied, and terminals 63b, 63c for applying a d-c voltage across the Hall effect device 4a. The other Hall effect devices 4b, 4c are of the same construction. The illustrated arrangement allows the terminals 63a–63d to be led out downwardly of the yoke 62, and assists an air gap spacing E in being reduced.

Although the illustrated semiconductor motor is of the disc type (flat type), a cylindrical semiconductor motor may be constructed which is completely of the same winding type. With such an alternative, a magnet rotor is in the form of either a solid cylinder which is internally rotatable, or a hollow cylinder which is externally rotatable, and armature coils 2a, 2b and 2c are fixedly arranged inwardly of a hollow cylindrical magnetic yoke or outwardly of a solid cylindrical magnetic yoke.

Figure 2:
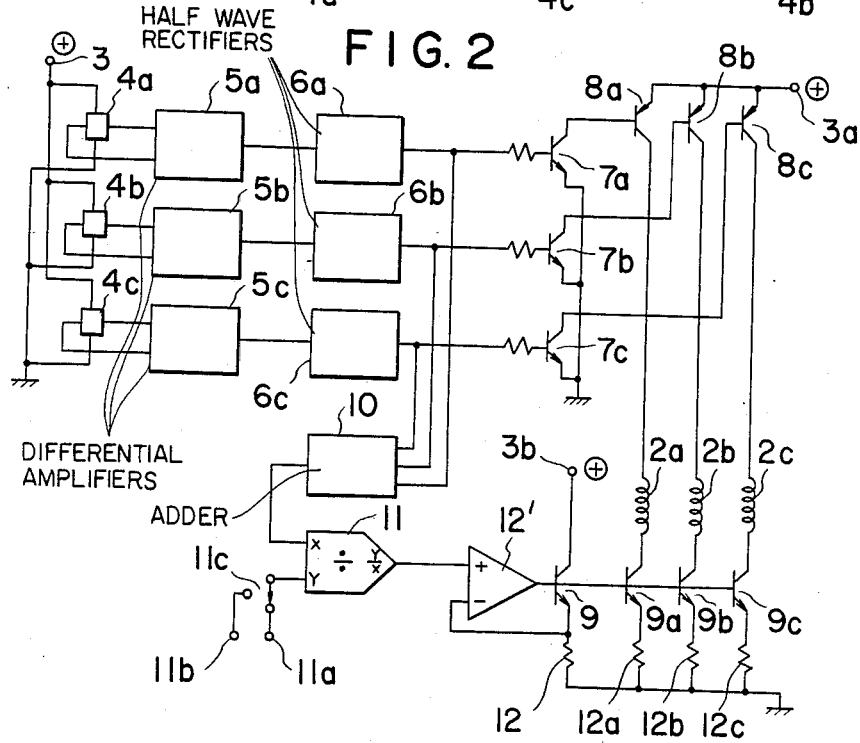
FIG. 2 is a circuit diagram, partly in block form, of an energization control circuit in an apparatus according to the present invention.

There are various systems available for energizing the armature coils. FIG. 2 shows one of energization control circuits for enabling the three phase coils to conduct only in one direction to produce a driving torque.

In FIG. 2, the Hall effect devices 4a, 4b and 4c are supplied with a constant current from a positive terminal 3 of a constant-voltage power supply. Upon rotation of the magnet rotor 1, the Hall effect devices 4a–4c generate three-phase alternating currents. The outputs from the Hall effect devices 4a–4c are amplified respectively by differential amplifiers 5a, 5b and 5c, and amplified outputs from the differential amplifiers are rectified by half-wave rectifiers 6a, 6b and 6c, respectively. The waveforms of the outputs from the differential amplifiers 5a, 5b and 5c are shown respectively by curves 13a, 13b and 13c indicated by the solid, dot, and dot-and-dash lines, respectively, at A1 in FIG. 3. The horizontal axis of the graph is indicative of the angle $\theta$ of rotation of the magnet rotor 1. The curves of the graph A1 represent curves of magnetic field distribution that is proportional to the intensity of a magnetic field generated by the field system. In the illustrated embodiment, the magnetic field becomes progressively more intensive during a first one-third interval, is kept even or flat during a second one-third interval, and becomes progressively less intensive during a final one-third interval. The present invention is also applicable to a motor having a field system for generating such a magnetic field which has its intensity sharply increasing during the second one-third interval.

The curves of the graph A2 are indicative of the outputs from the half-wave rectifiers 6a, 6b and 6c shown in FIG. 2. The outputs from the half-wave rectifiers 6a, 6b and 6c energize transistors 7a, 7b and 7c, respectively, which in turn cause transistors 8a, 8b and 8c to conduct in their saturation region. A positive power supply terminal 3a is connected to the emitters of the transistors 8a–8c.

The outputs from the half-wave rectifiers 6a, 6b and 6c are also fed to an adder 10 in which they are added together. An output of the adder 10 is indicated at 15a in the graph A3 of FIG. 3. The output from the adder 10 is delivered to a divider 11 to which a constant voltage is applied via a terminal 11a and a switch 11c. The voltage applied to the divider 11 through the terminal 11a serves to control an output torque of the motor as described later on. The divider 11 delivers its output to an analog operational circuit 121 (hereinafter referred to "opamp"). A voltage applied between the base and emitter of a transistor 9 is thus in proportion to the output from the divider 11. A voltage which is the sum of a voltage drop across a resistor 12 and the output voltage from the divider 11 is applied between the base and emitter of each of transistors 9a, 9b and 9c. The transistors 9a, 9b, 9c and 9 all operate in the active region. The transistor 9 has its collector connected to a positive terminal 3b of a constant-voltage supply, which may be shared by the terminal 3.

With the resistor 12 and resistors 12a, 12b and 12c being equal to one another, the collector currents for the transistors 9, 9a, 9b and 9c, that is, currents flowing through the armature coils 2a, 2b and 2c are controlled in magnitude in proportion with the output from the divider 11. When some of the armature coils are energized simultaneously, the currents flowing therethrough are kept equal to each other at all times while they are varied. When either one of the transistors 8a, 8b and 8c is de-energized, a corresponding one of the armature coils is also de-energized.

The foregoing energization control will be described with the aid of equations. Since the input voltage applied to the terminal 11a is proportional to the output torque, the input voltage can be expressed by T (output torque) if a proportionality constant is ignored. Assuming that the output voltage from the adder 10 is given as H with a proportionality constant ignored as the output voltage is in proportion to the intensity H of the magnetic field, the output from the divider 11 can be expressed as T/H, which is denoted by the dotted line 15b in the graph A3 of FIG. 3. Since the magnetic field intensity H is the sum of the intensities of magnetic fields H1, H2 and H3 which extend through the three-phase armature coils, T/H can also be expressed by $T/(H1+H2+H3)$.

As the currents, denoted as I, flowing through the armature coils are equalized while they are changing, the current I can be given by: $I=T/(H1+H2+H3)$. This equation can be modified to: $I(H1+H2+H3)=T$, or $T=IH1+IH2+IH3$.

The terms IH1, IH2 and IH3 are indicative respectively of torques generated by the armature coils. With the input voltage applied to the terminal 11a being constant, the combined output torques are rendered constant at all times and hence no torque ripple is created. The output torque is variable in proportion to a change in the input voltage to the terminal 11a. Thus, a voltage which corresponds to a desired output torque may be applied to the input terminal 11a. The currents flowing through the armature coils 2a, 2b and 2c are indicated respectively by 16a, 16b and 16c in the graphs A4, A5 and A6, respectively, of FIG. 3. The torques generated by the armature coils 2a, 2b and 2c are represented by curves 17a, 17b and 17c, respectively, in the graph A7 of FIG. 3. As shown by the theory described above, these torques as combined are rendered flatwise or even with any torque ripples eliminated.

The intensity of the magnetic field generated by each magnetic pole increases during the central one-third interval as shown in the graph A1. In this case, the central one-third of the energization waveform in each of the graphs A4, A5 and A6 will be depressed, making the combined output torques even or smooth.

While in the illustrated embodiment the three-phase armature coils are used, the present invention is applicable to two-phase armature coils. With the modified arrangement, armature coils which are in the same phase are two in number as is well known, and hence a total of four armature coils are required, so that an additional transistor for energization control is needed for each groups of transistors.

Where the invention is applied to a motor having eight magnetic poles in its field system and six armature coils, torque ripples can be removed by effecting energization control with two armature coils in the same phase being connected in series with each other. In this case, small torque ripplies remain unremoved because of the differences between curves of magnetic field distribution of the magnetic poles. Such small torque ripples, however, are practically negligible. The Hall effect devices 4a, 4b and 4c may be displaced from their positions aligned with the conductors of the armature coils laterally by a distance corresponding to the width of the field system to effect energization control of the armature coils. Though such an arrangement can generate a driving torque, small torque ripples remain unremoved but may be practically ignored. The above arrangement of the Hall effect devices is made possible especially with a motor having field system with eight magnetic poles and three armature coils. While in the illustrated embodiment the Hall effect devices are used as means for detecting positions of the magnet rotor and controlling torque ripples, other elements for detecting a magnetic field may be used, and separate means may be employed respectively for controlling torque ripples and detecting magnet rotor positions.

Where the motor according to the present invention is utilized as a motor for directly driving a take-up reel in a cassette tape recorder, the terminal 11a is supplied with a voltage for producing a torque (about 20 gram-centimeter in general) required to wind the magnetic tape. The magnetic tape can be wound during the playback mode with a constant torque corresponding to an input reference voltage, resulting in sound reproduction of high quality. With conventional means, such torque control has been impossible, and a felt member has been used to produce a frictional force which is utilized to filter out torque ripples, an arrangement which would produce torque ripples due to variations in the frictional force and cause difficulty on account of wear-out of the felt member. Furthermore, a complex mechanism has been needed to disengage the friction mechanism during the fast-forward mode of operation. According to the present invention, the above problems can all be eliminated: No torque ripples are produced during playback; The switch 11c is changed over to a terminal 11b during the fast-forward mode to supply a higher voltage for producing a maximum output torque.

A constant-speed control system using the apparatus of the present invention will now be described. Such a system can effectively used for controlling a capstan motor or a motor for directly driving the turntable of a record player.

As shown in FIG. 11, the constant-speed control system comprises a semiconductor motor 76 having a rotatable shaft for directly driving the capstan or the turntable, and an apparatus 81 according to the present invention for removing torque ripples. The armature coils 2a, 2b and 2c in the electrical circuit as shown in FIG. 2 are actually included in the motor 76.

A shaft encoder 76a is affixed to the rotatable shaft of the motor 76 for producing an output which is converted into an alternating current having a frequency proportional to the speed of rotation of the motor in any known manner. The alternating current is delivered to a waveform shaper circuit 78, which produces an output that is converted into a d-c voltage by a frequency-to-voltage converter 79. An output from the frequency-to-voltage converter 79 is fed to an analog comparator 80, which has an input terminal 80a to which there is applied a reference voltage for determining a speed of rotation of the motor 76. The comparator 80 supplies its output to the terminal 11a (FIG. 2) of the apparatus 81.

Upon starting of the motor 76, the output from the frequency-to-voltage converter 79 is large and hence the comparator 80 produces a large output voltage, whereupon the motor 76 is accelerated with a maximum output torque. As the speed of rotation of the motor 76 approaches a set speed, the output from the comparator 80 is rapidly reduced and hence the output torque is reduced to stop acceleration. The motor 76 is now allowed to rotate at a constant speed with the output torque counterbalancing a load torque. As the load is increased, the speed of rotation of the motor 76 is reduced, so that the output from the frequency-to-voltage converter 79 is increased. Thus, the comparator 80 produces an increased output which results in an increased output torque, with the result that the motor 76 can be driven at a constant speed. When the load is reduced, the system operates in a reversed manner. The system thus effects constant-speed control of the motor 76. With the illustrated system, there is no need to eliminate torque ripples with an FG servo circuit which has heretofore been required, and the frequency of the alternating current generated by the shaft encoder 76a does not need to be increased as with the known arrangement. Thus, the system can be constructed less costly. As an alternative, sufficient constant-speed control can be achieved by utilizing outputs from the Hall effect devices 4a, 4b and 4c (FIG. 1), instead of the shaft encoder, to generate a train of electrical pulses having a frequency proportional to the number of RPM of the motor, thereby constituting an FG servo circuit.

Other known means for constant-speed control, such as a PLL control system, may be used. Stated otherwise, any means capable of generating an electrical signal in response to a deviation of the speed of rotation from a set speed can be used in association with the apparatus of the invention to accomplish constant-speed control by delivering such an electrical signal to the terminal 11a shown in FIG. 2.

The transistors 8a, 8b and 8c shown in FIG. 2 may be replaced with a commutation circuit having SCRs (silicon controlled rectifiers). The inductances of the armature coils 2a, 2b and 2c may be utilized instead of the transistors 9, 9a, 9b and 9c to form a waveform similar to the waveform of an output from the opamp 12 and energize the armature coils in the pattern of the waveform thus formed, for thereby removing torque ripples. With the latter alternative, Joule heat can be reduced as switching elements operable in their saturation region are used due to current control.

Figure 4:
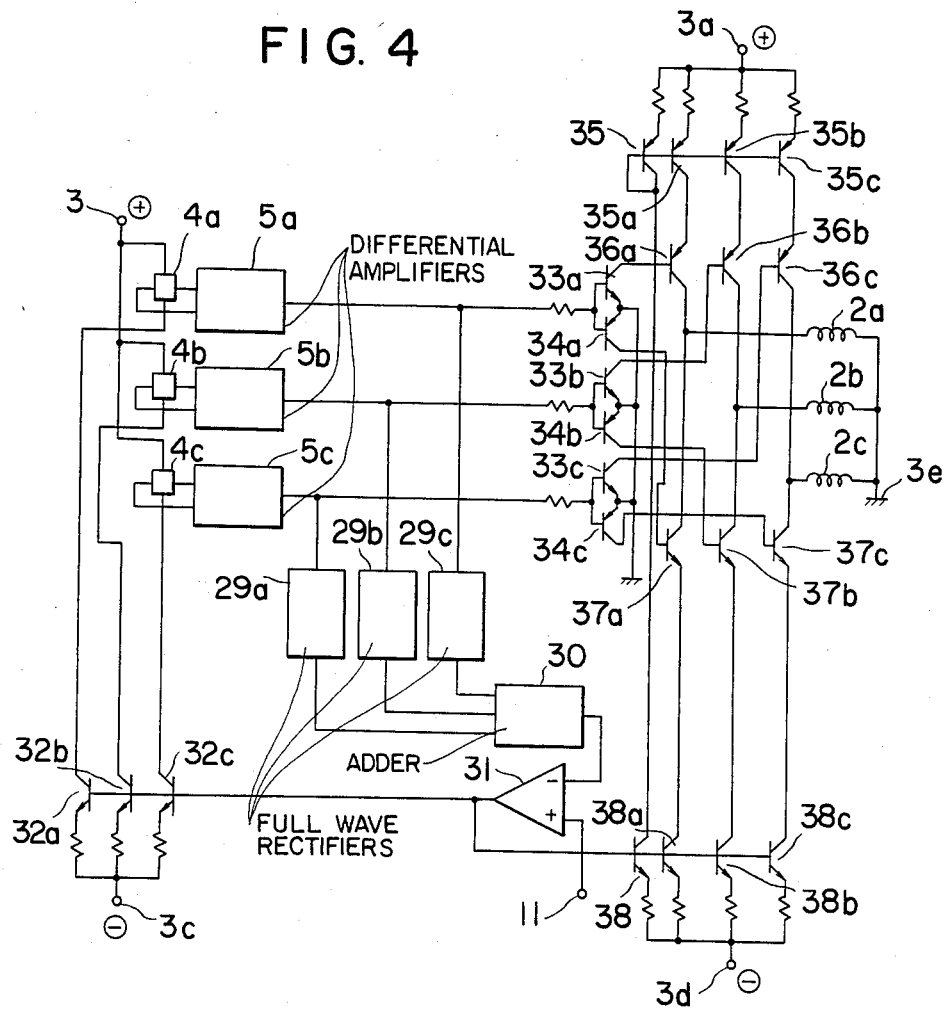
FIG. 4 is a circuit diagram, partly in block form, of an energization control circuit in an apparatus according to another embodiment of the present invention.

According to an embodiment shown in FIG. 4, the present invention is applied to a semiconductor motor having three-phase armature coils which are energizable in opposite directions at an electric angle of 180 degrees. The same parts shown in FIG. 4 are denoted by the same reference characters shown in FIG. 2. In the embodiment of FIG. 4, the Hall effect devices 4a, 4b and 4c serve to detect a magnetic field, and also double as multipliers for multiplication by armature currents. The positive terminals 3, 3a of the direct-current power supply are connected in common, negative terminals 3c, 3d are also connected in common, and a point at an intermediate voltage therebetween is connected to a ground terminal 3e. Thus, energization in opposite directions can be effected by a two-power-supply system.

Outputs from the differential amplifiers 5a, 5b and 5c are proportional to the intensity of a magnetic field generated by the field system, and are shown in the graph C1 in the timing chart of FIG. 5(a). The curves shown by the solid, dotted, and dot-and-dash lines 13a, 13b and 13c are indicative of the outputs from the Hall effect devices 4a, 4b and 4c, respectively. Full-wave rectifiers 29a, 29b and 29c produce outputs as shown in the graph C2 of FIG. 5(a). The outputs from the full-wave rectifiers 29a, 29b and 29c are added together by an adder 30 which produces an output that is indicated by the solid line 39a in the graph C3 of FIG. 5(a).

The output from the differential amplifier 5a alternately energizes transistors 33a, 34a, which produce outputs causing transistors 36a, 37a to conduct alternately. Thus, the armature coil 2a is energized accordingly in opposite directions. The transistors 36a, 37a operate in their saturation region.

Likewise, the output from the differential amplifier 5b energizes transistors 33b, 34b and transistors 36b, 37b alternately, thus causing the armature coil 2b to conduct alternately in both directions. Similarly, transistors 33c, 34c and transistors 36c, 37c are caused by the output from the differential amplifier 5c to conduct alternately, energizaing the armature coil 2c alternately in opposite directions. The energization of the armature coils in the foregoing manner produces a driving torque on the magnet rotor 1 to rotate the latter in one direction.

The opamp 31 produces an output which is applied as a base voltage for transistors 32a, 32b and 32c. Since emitter resistors connected to the transistors 32a–32c are equal, equal currents which are proportional to the base voltage flow through the Hall effect devices 4a, 4b and 4c. The outputs from the Hall effect devices are proportional to the products of the intensities H1, H2 and H3 of magnetic fields and currents I0 flowing through the Hall effect devices. The output from the adder 30 is in proportion to I0(H1+H2+H3).

The output from the opamp 31 is applied as a voltage between the base and emitter of each of the transistors 38a, 38b and 38c, so that the collector current of each transistor 38a–38c is proportional to the current I0. The transistors 38, 38a, 38b, 38c, 35, 35a, 35b and 35c have equal emitter resistors, and are of the same characteristics. As the transistors 38a–38c and the transistors 35a–35c are connected in series with one another, they share the same collector currents. Therefore, the collector currents of the transistors 35a, 35b and 35c are rendered equal.

With the arrangement of FIG. 4, the currents that flow through the armature coils 2a, 2b and 2c in both directions are controlled by the output from the opamp 31, so that the currents I flowing through the three-phase armature coils will be kept equal to each other at all times as they vary. As described above, the current I is proportional to the current I0. The opamp 31 has a terminal 11 to which there is applied a set voltage (reference voltage) corresponding to a desired output torque. Thus, the opamp 31, the transistors 32a–32c, and the adder 30 jointly constitute a negative feedback circuit which causes the current I0 to vary so as to equalize I0(H1+H2+H3) with an input voltage T (which may be considered to be an output torque) applied to the terminal 11. Thus, $T=I0(H1+H2+H3)$, and since the current I0 is deemed equal to the current I if a proportionality constant is ignored, the above equation can be changed into $T=IH1+IH2+IH3$. The terms IH1, IH2 and IH3 are indicative of torques generated by the armature coils 2a, 2b and 2c, respectively, so that combined torques are rendered constant with torque ripples eliminated. When the input voltage to the terminal 11 is changed, the output torque is changed accordingly. The apparatus illustrated in FIG. 4 may be associated with a constant-speed control circuit as shown in FIG. 11 to effect constant-speed control.

The solid-line curve 39a in the graph C3 of FIG. 5(a) is indicative of the output from the adder 30, and the dotted-line curve 39b is indicative of the output from the opamp 31. Curves 40a, 40b and 40c in the graphs C4, C5 and C6 of FIG. 5(a) are illustrative of the waveforms of currents flowing through the armature coils 2a, 2b and 2c, respectively, which are energized.

Curves 45a, 45b and 45c in the graphs C7, C8 and C9 of FIG. 5(b) indicate the waveforms of output torques generated respectively by the armature coils 2a, 2b and 2c, the output torques being combined into a flat or even output torque.

It is apparent that energization of two-phase armature coils can be carried out using the same arrangement.

Figure 6:
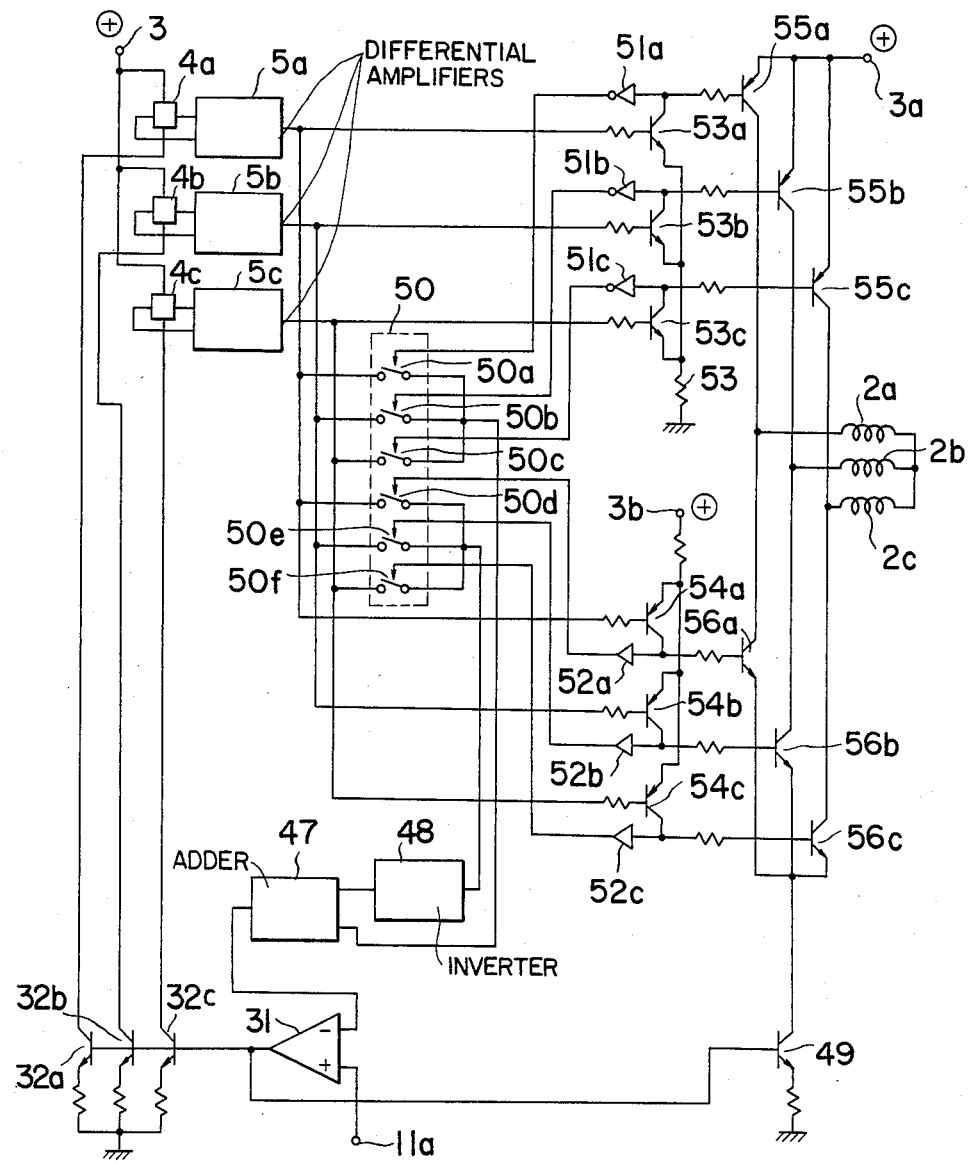
FIG. 6 is a circuit diagram, partly in block form, of an energization control circuit in an apparatus according to still another embodiment of the present invention.

FIG. 6 shows an embodiment in which the present invention is applied to a semiconductor motor having Y-connected armature coils. The armature coils are energized in opposite directions during intervals which are an electrical angle of 120 degrees. Identical parts shown in FIG. 6 are denoted by identical reference characters used in the preceding embodiments.

Figure 7A:
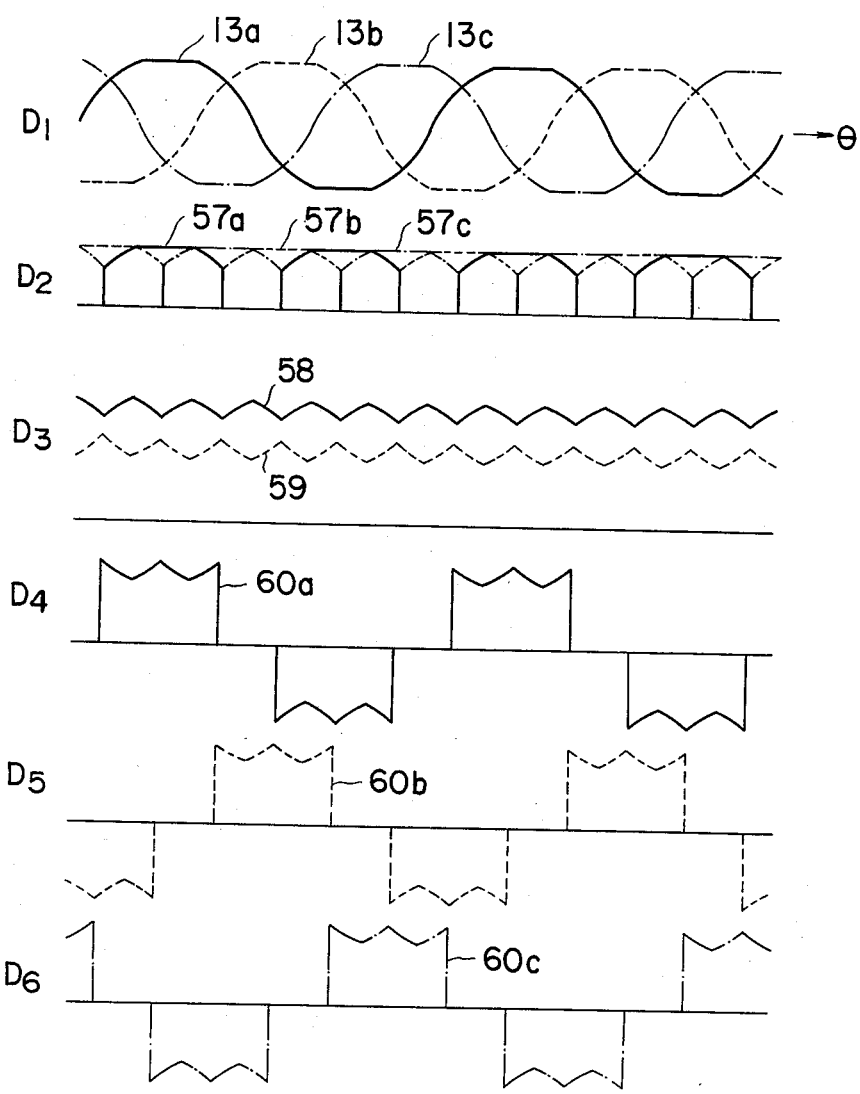
FIGS. 7(a) and 7(b) are timing charts for voltages and currents in the control circuit shown in FIG. 6.

Outputs from the differential amplifiers 5a, 5b and 5c are shown in the graph D1 of FIG. 7(a). Outputs from the Hall effect devices 4a, 4b and 4c are shown by curves 13a, 13b and 13c. Transistors 53a, 53b and 53c consititute a differential circuit due to the presence of an emitter resistor 53, removing overlapped outputs. The same holds true with transistors 54a, 54b and 54c which is powered by a positive voltage terminal 3b of a power supply. However, the former differential circuit is energized by positive half-wave currents from the differential circuits 5a, 5b and 5c, and the latter differential circuit is energized by negative half-wave currents from the differential circuits 5a, 5b and 5c. The transistors 53a, 53b and 53c energize transistors 55a, 55b and 55c, respectively, for controlling them in their saturation region. Likewise, the transistors 54a, 54b and 54c energize transistors 56a, 56b and 56c, respectively, which are controlled in their saturation region. Thus, the semiconductor motor is caused to rotate with a driving torque which is completely the same as those generated by conventional apparatus.

Designated at 50 is an analog multiplexer comprising analog switches 50a, 50b and 50c which are actuatable by outputs from inverters 51a, 51b and 51c and analog switches 50d, 50e and 50f which are actuatable by outputs from non-inverters 52a, 52b and 52c.

Positive half-wave outputs from the differential amplifiers 5a, 5b and 5c are cut off at an electrical angle of 120 degrees by the analog switches 50a, 50b and 50c, and negative half-wave outputs from the differential amplifiers 5a, 5b and 5c are cut off at an electrical angle of 120 degrees by the analog switches 50d, 50e and 50f.

Outputs from the analog switches 50a, 50b and 50c are combined and delivered to an adder 47. The analog switches 50d, 50e and 50f produce outputs which are added and supplied via an inverter 48 to the adder 47.

As with the preceding embodiment, the transistors 32a, 32b and 32c, the opamp 31 and the adder 47 jointly constitute a negative feedback circuit. Therefore, the adder 47 produces an output which is the product of the current I0 flowing through the Hall effect devices as energized and the intensities H1, H2 and H3 of magnetic fields as detected by the Hall effect devices 4a, 4b and 4c, the product being thus indicated by I0(H1+H2+H3). The current I0 is adjusted so as to bring the output from the adder 47 into conformity with the input to the terminal 11a, that is, a desired output torque. The output from the adder 47 is shown in the graph D2 of FIG. 7(a). Solid-line, dotted-line, and dot-and-dash-line curves 57a, 57b and 57c are indicative of the waveforms of outputs from the Hall effect devices 4a, 4b and 4c, respectively.

The opamp 31 produces an output which is applied as a base voltage for each of the transistors 32a, 32b and 32c, so that the current I0 is proportional to armature currents I. The currents I flow through a series-connected circuit of the armature coils, and hence are variable. However, the currents flowing through the armature coils as energized are rendered equal at all times.

If a proportionality constant is ignored, an input voltage T applied to the terminal 11a is equal to I(H1+H2+H3). As IH1, IH2 and IH3 are indicative of output torques generated by the armature coils, respectively, the combined torques are constant at all times in proportion to the input voltage applied to the terminal 11a, and torque ripples are eliminated. Thus, the apparatus shown in FIG. 6 may be combined with means illustrated in FIG. 11 to achieve constant-speed control.

A solid-line curve 58 in the graph D3 of FIG. 7(a) shows the waveform of an output from the adder 47, and a dotted-line curve 59 shows the waveform of an output from the opamp 31. Graphs D4, D5 and D6 illustrate the waveforms 60a, 60b and 60c of currents flowing through the armature coils $2a$, $2b$ and $2c$, respectively.

Figure 7B:
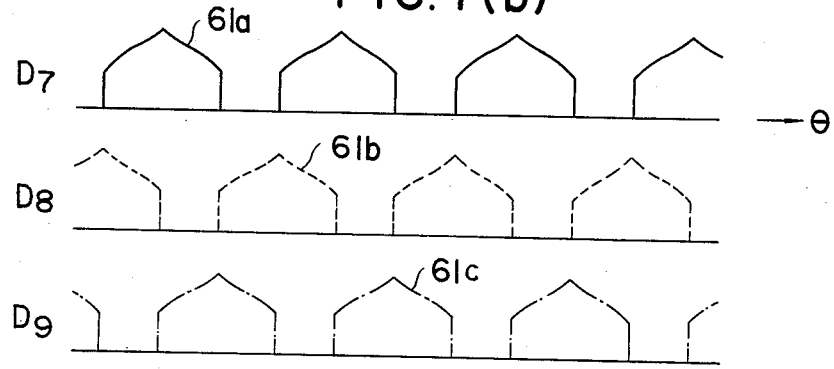

Curves $61a$, $61b$ and $61c$ in the graphs D7, D8 and D9 of FIG. 7(b), respectively, indicate torques generated by the armature coils $2a$, $2b$ and $2c$, respectively, which are proportional to IH1, IH2 and IH3, respectively. As described above, the combined torques become even or flat with no torque ripples contained.

Figure 3:
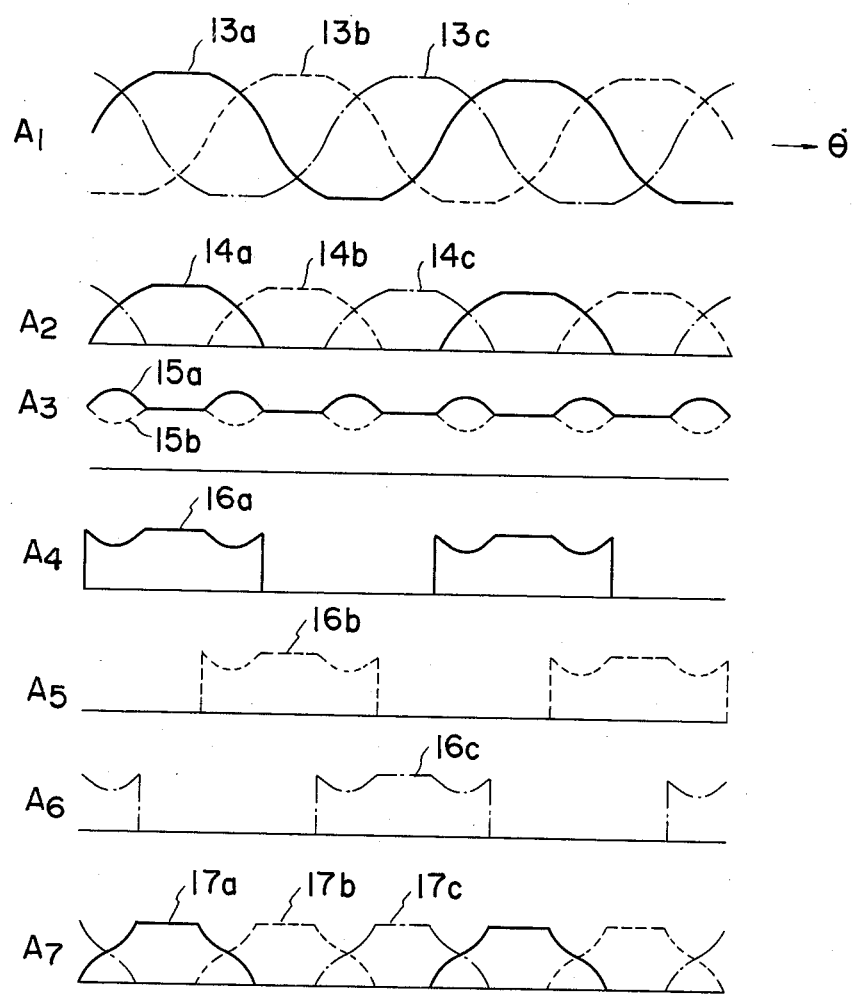
FIG. 3 is a timing chart for voltages and currents in the control circuit shown in FIG. 2.

As seen from the graph A4 of FIG. 3, the graph C4 of FIG. 5(a), and the graph D4 of FIG. 7(a), for example, leading and trailing edges of currents flowing through the armature coils are steep. Such waveforms tend to generate electrical noises, and have the risk of increasing a copper loss as no magnetic field is generated at such edges.

The above shortcomings are overcome by an energization control circuit shown in FIG. 9. The armature coils $2a$, $2b$ and $2c$ are energized in the same manner as those shown in FIG. 2, that is, the armature coils are energized in one direction in three phases. Identical parts are indicated by identical reference characters used in the preceding embodiments.

Outputs from the half-wave rectifiers $6a$, $6b$ and $6c$ are applied to two inputs of multipliers $65a$, $65b$ and $65c$, which produce outputs that are the second power of the half-wave outputs from the Hall effect devices $4a$, $4b$ and $4c$, that is, $H1^2$, $H2^2$ and $H3^2$.

Outputs from the multipliers $65a$, $65b$ and $65c$ are supplied to an adder 69 in which they are added together. The adder 69 supplies its output to one input of a divider 70.

A graph E1 in the timing chart of FIG. 10 shows curves $13a$, $13b$ and $13c$ which are indicative of outputs from the differential amplifiers $5a$, $5b$ and $5c$ as dependent on outputs from the Hall effect devices $2a$, $2b$ and $2c$, respectively. A graph E2 illustrates outputs from the half-wave rectifiers $6a$, $6b$ and $6c$ as curves $14a$, $14b$ and $14c$, respectively.

The outputs from the multipliers $65a$, $65b$ and $65c$ are shown in a graph E3 by solid-line, dotted-line, and dot-and-dash-line curves $71a$, $71b$ and $71c$, respectively, which are dependent on the outputs from the Hall effect devices $4a$, $4b$ and $4c$. A curve 72 which is indicative of the output from the adder 69 is shown in a graph E4.

A reference voltage (which may be considered to be an output torque) that corresponds to a desired output torque is applied to the terminal 11, the reverence voltage being indicated here as T. The input voltage T is divided in the divider 70 by the output from the adder 69, that is, $H1^2+H2^2+H3^2$ as described above. The divider 70 produces an output of $T/(H1^2+H2^2+H3^2)$, which is indicated by a curve 73 in a graph E5. Assuming that $T/(H1^2+H2^2+H3^2)=K$, the output K is supplied to one input of each of the multipliers $66a$, $66b$ and $66c$. The other inputs of the multipliers $66a$, $66b$ and $66c$ are supplied with the outputs H1, H2 and H3 from the half-wave rectifiers $6a$, $6b$ and $6c$, respectively. Thus, the multipliers $66a$, $66b$ and $66c$ produce outputs KH1, KH2 and KH3, respectively.

The outputs KH1, KH2 and KH3 are fed respectively to opamps $67a$, $67b$ and $67c$ which produce outputs that are proportional to the outputs KH1, KH2 and KH3. The output voltages from the opamps $67a$, $67b$ and $67c$ are applied between the base and emitter of transistors $68a$, $68b$ and $68c$, respectively. Collector currents of these transistors $68a$, $68b$ and $68c$, that is, currents flowing through the armature coils $2a$, $2b$ and $2c$, respectively, are thus in proportion to KH1, KH2 and KH3, respectively.

The curve 73 shown in the graph E5 of FIG. 10 is indicative of the output K from the divider 70, as described above.

It follows from the foregoing description that when the equation $T/(H1^2+H2^2+H3^2)=K$ is developed, $KH1H1+KH2H2+KH3H3=T$ results. Assuming that KH1=I1, KH2=I2, and KH3=I3, I1, I2 and I3 denote currents that flow through the armature coils $2a$, $2b$ and $2c$, so that the following equation results: $T=I1\cdot H1+I2H2+I3H3$.

Since I1H1, I2H2 and I3H3 are indicative of torques generated by the armature coils, the combined torques have a constant value T with no torque ripples contained. The apparatus may be incorporated in the system as shown in FIG. 11 to effect constant-speed control as with the preceding embodiments. Curves $74a$, $74b$ and $74c$ shown in graphs E6, E7 and E8, respectively, of FIG. 10 represent the currents flowing through the armature coils $2a$, $2b$ and $2c$, respectively. The currents have less steep leading and trailing edges, which eliminate the difficulties with the foregoing embodiments.

According to the embodiment shown in FIG. 9, the value K is controlled so as to eliminate torque ripples and gain an energization curve which approximates the intensity curve of a magnetic field.

A graph E9 shows curves $75a$, $75b$ and $75c$ which are indicative of torques generated by the armature coils $2a$, $2b$ and $2c$, the torques being combined into an even torque.

Current control effected by the transistors $68a$, $68b$ and $68c$ shown in FIG. 9 generates Joule heat. Where there is provided an inductance control means in which the inductances of the armature coils $2a$, $2b$ and $2c$ are utilized to form a chopper circuit for generating the energization waveforms similar to the waveforms of the outputs from the opamps $67a$, $67b$ and $67c$, a semiconductor motor suffers only from a small amount of Joule heat.

The concept of the embodiment shown in FIG. 9 may be incorporated in a motor having three-phase armature coils that are energizable in opposite directions, such as the driving means as shown in FIG. 4.

Where a motor has two-phase armature coils which are energizable in opposite directions at an electrical angle of 180 degrees, the number of Hall effect devices used is two, and outputs from the Hall effect devices are subjected to full-wave rectification. Outputs from the full-wave rectifiers are multiplied by four multipliers, which produce squared outputs that are divided by a divider into K. The armature coils are supplied with currents which are proportional to products of the value K and Hall effect voltages which cause the armature coils to conduct, thus eliminating torque ripples. With this alternative, the electrical circuit may be simplified by using a known means for energizing four armature coils in one direction only. The present invention can be carried out using other magnetic field detecting means than the Hall effect devices, such as induction coils disposed in phase with the armature coils for producing detected outputs.

Figure 12:
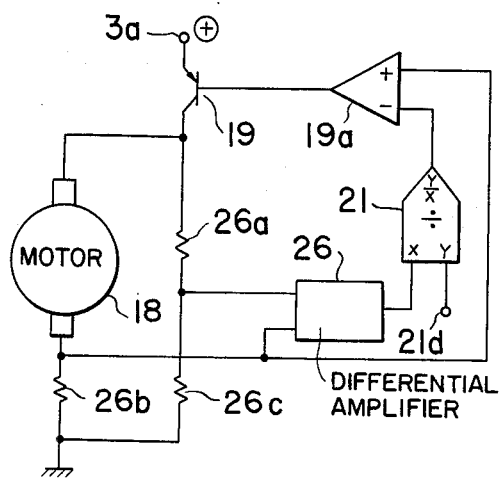
FIG. 12 is a block diagram of an electrical circuit for an apparatus according to the present invention.

In FIG. 12, designated at 18 is a direct-current motor such for example as a three-phase Y-connected commutator motor. The direct-current motor 18 and resistors $26b$, $26c$ and $26a$ jointly constitute a bridge circuit, which is supplied with a current from a positive power-supply terminal 3a via a transistor 19.

The bridge circuit is adjusted such that when the motor 18 is stopped, the bridge circuit is in equilibrium, and no differential input voltage is applied to a differential amplifier 26, which thus produces no output. A divider 21 is supplied with an output from the differential amplifier 26 and a set voltage or a reference voltage from a constant-voltage power supply via a terminal 21d. The reference voltage is applied to bring the output torque of the motor 18 into a desired value.

Figure 14:
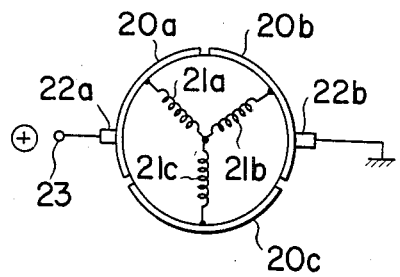
FIG. 14 is a schematic diagram illustrative of armature coils and a commutator.

An opamp 19a amplifies an output from the divider 21 to control a base current for the transistor 19. Armature coils of the motor 18 and commutator brushes thereof are shown in FIG. 14. The armature coils 21a, 21b, 21c have one common terminal and the other terminals connected to commutator segments 20a, 20b, 20c, respectively. A field system (not shown) has two north-seeking and south-seeking poles which are angularly spaced 180 degrees. The commutator also includes a pair of brushes 22a, 22b which are diagonally opposite, that is, angularly spaced 180 degrees.

When the armature rotates, two of the armature coils are successively connected in series with each other and supplied with a current from a terminal 23, with the other armature coil idling. The armature coils are energized at an angle of 120 degrees. A counterelectromotive force E which is generated between the brushes 22a, 22b is expressed by:

$$E = K1N(H1 + H2 + H3) \quad (1)$$

where K1 is a constant, N is the speed of rotation, and H1, H2 and H3 are the intensities of magnetic fields generated by the field system in the intervals in which the armature coils 21a, 21b and 21c are energized, respectively.

An output torque T generated is given by:

$$T = K2I(H1 + H2 + H3) \quad (2)$$

where K2 is a constant. Thus, the equation (1) can be modified into:

$$E = K1NT/IK2 = K3NT/I \quad (3)$$

where K3 is a constant. Accordingly, the product of the output torque and the speed of rotation is proportional to the counterelectromotive force E. The differential amplifier 26 shown in FIG. 12 produces an output E, which is an input to the divider 21 and is equal to the counterelectromotive force E. Assuming that the input voltage applied to the terminal 21d is given as V0, the divider 21 produces an output of V0/E, and the collector current for the transistor 19, that is, an armature current I for the motor 18 is caused by the opamp 19a to be proportional to V0/E. Currents flowing through the resistors 26a, 26c are so small that they are negligible for practical purposes. The armature current I is supplied so that it satisfies the following equation:

$$I = V0/E \quad (3-1)$$

Substituting the equation (3), the following results:

$$I = V0I/K3NT, \text{ or } V0 = K3NT \quad (4)$$

The above equation indicates that the product of the speed of rotation and the output torque is constant. The equation also indicates that when the speed of rotation is constant, the output torque is also constant. Since the product of E and I is constant as understood from the equation (3-1), the output torque T is rendered constant and torque ripples are removed as can be seen from the following equation:

$$EI = K1NI(H1 + H2 + H3) = K1/K2NT$$

which can be derived from the equations (1) and (2). Where the motor 18 is of the coreless type and is driven under Fleming's rule (due to an electrodynamic torque), the equation (4) is applicable.

Where the motor 18 is of the three-pole type having a core, small torque ripples due to cogging tend to remain unremoved but are practically negligible. It is apparent that the foregoing arrangement can be applied to semiconductor motors, and motors having two-phase or three-phase armature coils.

Where the armature coils are delta-connected, the equation (4) is not applicable in a strict sense for the following reason:

As described with reference to FIG. 14, where the armature coils are Y-connected, the counterelectromotive forces generated by the armature coils 21a, 21b and 21c are added together and picked up by the brushes 22a, 22b. The output torques generated by the armature coils are also added together into a combined output torque. Thus, the way of adding the counterelectromotive forces is in conformity with the way of adding the output torques, resulting in applicability of the equation (4). With the delta-connected armature coils, two coils form a series-connected circuit and one coil forms a parallel-connected circuit, with the result that the counterelectromotive forces are not picked up by the brushes as they are added together. Accordingly, the equation (4) cannot be relied on.

Where the motor is used as a motor for driving a capstan, the motor is naturally accompanied by a constant-speed control system. Since the speed T of rotation may be deemed constant, torque ripples can be removed by the control system as illustrated in FIG. 12.

Such control will be described in more detail with reference to FIG. 15. The control system may effectively be used irrespective of whether the rotatable shaft of the motor 18 is employed as a capstan or drives a flywheel through a rubber belt. Identical parts shown in FIG. 15 are denoted by identical reference characters illustrated in FIG. 12 and will not be described.

Figure 15:
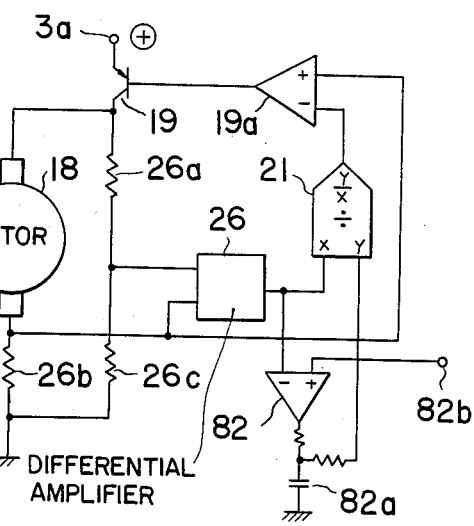
FIGS. 15 and 16 are block diagrams of electrical circuits for apparatus according to other embodiments.

In FIG. 15, an input voltage applied to a terminal 82b serves to indicate a desired speed of rotation of the motor. The terminal 82b is connected to a source of reference voltages which correspond to desired speeds of rotation. The input voltage applied to the terminal 82b is delivered to an input of an opamp 82. The other input of the opamp 82 is supplied with an output from the differential amplifier 26.

When the speed of rotation of the motor 18 increases in response to a load variation, the output from the opamp 82 is reduced, and the output from the divider 21 is also reduced. Therefore, the output voltage from the opamp 19a is increased to reduce the base current for the transistor 19, whereupon the armature current for the motor 18 which flows through the transistor 19 is also decreased.

It is now assumed that the load is constant and the output voltage from the opamp 82 is kept constant. The output voltage form the opamp 82 is smoothed by a capacitor 82a and applied to the terminal Y of the divider 21. Since the input to the terminal X of the divider 21 is proportional to H1+H2+H3 as described above, the output from the divider 21 is in proportion to T/(H1+H2+H3), T being dependent on the input voltage applied to the terminal 82b. When the load is constant, constant-speed rotation of the motor is maintained under the condition that the load and the output torque are equal to each other. Thus, the output torque T is rendered constant in response to the input voltage applied to the terminal 82b. The input voltage applied to the terminal Y of the divider 21 is determined dependent on the output torque T. Therefore, T/(H1+H2+H3) becomes the output of the divider 21.

Where the magnetic field is intensive, the counterelectromotive force is increased to raise the input voltage applied to the terminal X, whereupon the output from the divider 21 is reduced. Therefore, the output voltage from the opamp 19a is increased to reduce the armature current and the input voltage applied to the positive terminal of the opamp 19a.

Due to the foregoing operation, the difference between the input voltages applied to the positive and negative terminals of the opamp 19a is quite small. The armature current I is controlled by way of negative feedback which virtually eliminates the voltage difference between the positive and negative terminals of the opamp 19a. The armature current is controllably varied so as to satisfy $T/(H1+H2+H3)=I$, or $I(H1+H2+H3)=T$, thus removing torque ripples.

When the load increases, the speed of rotation of the motor is decreased to lower the input voltage applied to the negative terminal of the opamp 82. The opamp 82 thus generates an increased output which is applied to the terminal Y of the divider 21. The input voltage fed to the terminal X of the divider 21 is reduced. Thus, the divider 21 produces an increased output.

The output voltage from the opamp 19a is reduced to increase the armature current, increasing the output torque until it is commensurate with the load, whereupon the speed of rotation of the motor is rendered constant. The reversed operation is effected when the load is reduced, for constant-speed control.

The constant-speed control as described above may be expressed as follows: With the constant-speed control effected, the speed of rotation of the motor 18 is constant. Therefore N in the equation (4) is a constant, and the output torque T is rendered proportional to the right-hand input to the divider 21, that is, the voltage V0 as described above, with output torque ripples removed. When the speed of rotation fluctuates in the foregoing constant-speed control, the counterelectromotive force also varies slightly. However, variations in the counterelectromotive force are in such a direction as to stabilize the above constant-speed control, and hence do not cause any problem.

The output voltage from the opamp 83 is smoothed by the capacitor 83a. If the output voltage contained ripples, the armature current would fluctuate in response to ripple voltages which would be delivered via the divider 21 and the opamp 19a. Therefore, the capacitor 82a should be used to effect complete smoothing of the output from the opamp 82.

Figure 16:
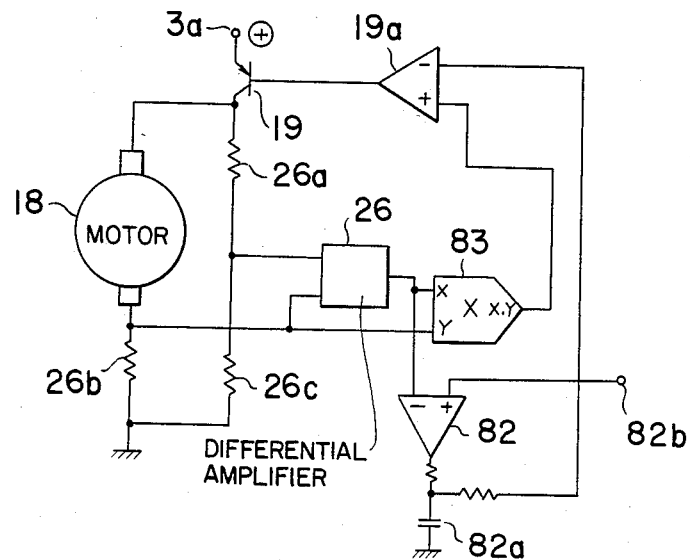

Another embodiment for carrying out the same constant-speed control will be described with reference to FIG. 16. Identical parts in FIG. 16 are designated by identical reference characters shown in FIG. 15, and will not be described.

A multiplier 83 has input terminals X and Y which are supplied with the output (H1+H2+H3) from the differential amplifier 26 and the armature current I, respectively. The multiplier 83 produces an output which is proportional to I(H1+H2+H3), or the output torque. As with the preceding embodiment, the speed N of rotation of the motor 18 is maintained at a set value in response to an input voltage applied to the terminal 82b and supplied via the opamp 82. Thus, the armature current is controlled through the opamp 19a so that the output torque will contain no torque ripples and be commensurate with the load on the motor.

While the motor is rotating at a constant speed, the input applied to the negative terminal of the opamp 19a is constant. When the output from the multiplier 83 is increased, the output voltage from the opamp 19a is also increased, and the armature current is decreased, with the results that the input voltage imposed on the terminal Y of the multiplier 82 is lowered, and the multiplier 82 generates a reduced output.

Through the above operation, the armature current is controlled such that the output from the multiplier 83 is kept constant at all times at a level which is dependent on the input to the negative terminal of the opamp 19a, that is, the input voltage applied to the terminal 82b. With this armature current control, $I(H1+H2+H3)=T$ and T is constant, with ripples removed from the output torque of the motor. When the motor load is increased, the speed of rotation of the motor is reduced, and the output from the opamp 82 is increased. Since the input voltage imposed on the negative terminal of the opamp 19a is increased, the output from the opamp 19a is decreased. The armature current is thus increased to make the output torque equal to the motor load, thus enabling the motor to rotate at a constant speed. When the load on the motor is reduced, the reversed mode of control is effected for controlling the motor to rotate at a constant speed.

Figure 17:
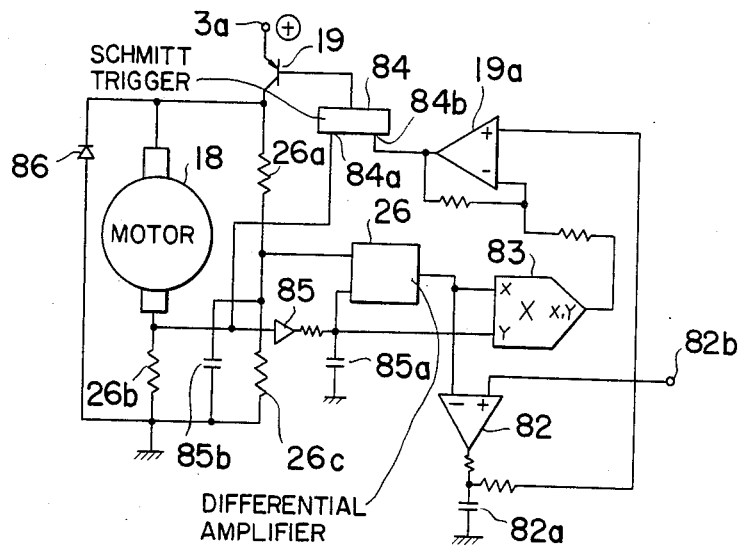
FIG. 17 is a block diagram of an electrical circuit according to another embodiment for effecting constant-speed control of a motor.

While in the embodiments shown in FIGS. 15 and 16 Joule heat generated by the transistor 19 is utilized to control the armature current, the inductances of the armature coils of the motor may instead be used to reduce Joule heat. FIG. 17 shows an embodiment in which such use of the armature coil inductances is employed. Identical parts in FIG. 17 are denoted by identical reference characters used in the preceding embodiment, and will not be be described.

When the transistor 19 conducts, the motor 18 is energized. The current flowing through the motor 18 progressively increases with time due to the inductances of the armature coils, and the motor starts rotating. As the speed of rotation which is governed by a set voltage applied to the terminal 82b, or the counterelectromotive force in the motor 18 approaches the input voltage imposed on the terminal 82b, the output from the opamp 82 is lowered. Conversely, as the counterelectromotive force in the motor 18 deviates from the input voltage applied to the terminal 82b, the output from the opamp 82 becomes increased. Thus, the output from the opamp 82 varies in inverse proportion to a variation in the speed of rotation of the motor 18. The output from the opamp 82 is smoothed by the capacitor 82a and is delivered as an input to the opamp 19a.

The opamp 19a has a loop of negative feedback which causes the output of hte opamp 19a to decrease and increase in response to an increase and a decrease, respectively, in the speed of rotation of the motor.

A Schmitt trigger circuit 84 has input terminals 84a, 84b. When an input voltage imposed on the terminal 84a is increased to the point where it exceeds the input voltage applied to the terminal 84b, the Schmitt trigger circuit 84 produces a rapidly increasing output at a high level, whereupon the transistor 19 is de-energized. When the input voltage imposed on the terminal 84a is reduced, the output from the Schmitt trigger circuit 84 goes low, causing the transistor 19 to conduct. The Schmitt trigger circuit 84 is constructed such that it provides slightly different hysteresis characteristics for the input voltages applied to the terminal 84a which energize and de-energize the transistor 19. It is assumed that the motor is subjected to a certain load and driven to rotate at a speed which is dependent on an input voltage applied to the terminal 82b. When the transistor 19 is in conduction, the armature current is increased in a pattern as indicated by a curve 25a shown in FIG. 13.

Figure 13:
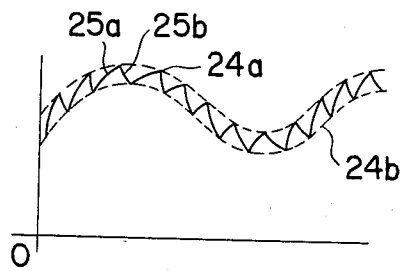
FIG. 13 is a graph showing a relationship between an armature current and time.

The graph of FIG. 13 has an axis of abscissa indicative of time and an axis of ordinate indicative of the armature current. When the armature current is increased to a level indicated by the botted line 24a, the input voltage applied to the terminal 84a (FIG. 17) is increased to render the output from the Schmitt trigger circuit 84 high, whereupon the transistor 19 is de-energized. The electrical energy stored in the inductances of the armature coils is discharged by a flywheel diode 86, thereby reducing the armature current in a pattern as indicated by a curve 25b in FIG. 13. When the voltage at the terminal 84a drops to a level indicated by the dotted line 24b, the output from the Schmitt trigger circuit 84 goes low, and hence the transistor 19 is allowed to conduct. The armature current is thus repeatedly increased and reduced. The frequency of such repetition is on the order of 20 KHz for ordinary micromotors.

The above ripple current is filtered by low-pass filters 85a, 85b to smooth the output from the differential amplifier 26 so as to be proportional to the speed of rotation of the motor. The low-pass filters 85a, 85b serve to filter out ripple voltages of 20 KHz as described above, but allow ripple voltages (normally on the order of 1,000 Hz) due to variations in the magnetic field to pass. Designated at 85 is a buffer amplifier having an amplification factor of 1.

Since the input voltage applied to the terminal 85b is increased or decreased via the opamp 19a to keep the output from the multiplier 83 constant, torque ripples can be removed as is understood from the equation of I(H1+H2+H3). At this time, the input voltage exerted on terminal 84b follows a curve which is located substantially midway between the dotted-line curves 24a, 24b as shown in FIG. 13.

When the speed of operation of the motor is increased or decreased in response to a load variation, the output voltage from the opamp 32 is reduced or increased accordingly, and the input voltage imposed by the opamp 19a on the terminal 84b is also reduced or increased accordingly. Thus, the mean value of the armature current is also reduced or increased to thereby prevent variations in the speed of rotation of the motor, or to effect constant-speed control.

Since the transistor 19 operates in its saturation region as described above, Joule heat can be eliminated and torque ripples can be removed. Therefore, the motor is of advantage when used as a motor for driving a capstan in a magnetic recording and playback device.

The means shown in FIG. 17 is a modification of the means shown in FIG. 16. It is evident that the means illustrated in FIG. 15 can similarly be used for constant-speed control using the inductances of the armature coils.

Where the apparatus of the invention is incorporated in a magnetic recording and playback device, the following advantages are produced. During the playback mode of operation, a magnetic tape is caused by a capstan to run at a constant speed of travel. As the diameter of the coiled magnetic tape becomes progressively larger, the take-up reel rotates at a progressively smaller speed. With the speed of rotation of the take-up reel becoming smaller, N in the equation (4) is reduced, and the output torque T is increased. Thus, the magnetic tape as it is wound is maintained at a constant tension. The motor as controlled by the apparatus of the invention can therefore be an optimum drive source for rotating the take-up reel.

Thus, there is provided in accordance with the invention a d-c motor which has the advantages discussed above. The embodiments described are intended to be merely exemplary and those skilled in the art will be able to make variations and modifications in them without departing from the spirit and scope of the inventions. All such modifications and variations are contemplated as falling within the scope of the claims.

What is claimed is:

1. An apparatus for removing torque ripples in a direct current motor having a magnet rotor and polyphase stator armature coils having conductors attributable to torque generation and controllably energizable in response to angular positions of the magnet rotor, said apparatus comprising:

means for detecting magnetic fields and producing output signals indicative of the detected magnetic fields, said detecting means being fixed in phase with the conductors of the polyphase armature coils;

energization circuit means for energizing the armature coils with currents which are of values obtained by multiplying the output signals from said detecting means by a common variable;

operational circuit means for effecting an arithmetic operation to obtain a sum of the products of currents flowing through said detecting means and the output signals from said detecting means, said currents being proportional to the currents flowing through the energized armature coils and said sum of products being indicative of output torques generated by said armature coils; and control circuit means for comparing said sum with a value corresponding to a desired output torque from the motor and controlling thereby said common variable so as to bring the sum into conformity with the value.

2. An apparatus for removing torque ripples in a direct current motor including a magnet rotor, and polyphase stator armature coils having conductors attributable to torque generation and controllably energizable in response to angular positions of the magnet rotor, said apparatus comprising:

means for detecting magnetic fields and producing signals indicative of the detected magnetic fields, said means being fixed in phase with the conductors of the polyphase armature coils;

energization circuit means for energizing the armature coils with currents in response to the output signals from said detecting means;

operational circuit means for effecting an arithmetic operation to obtain a combination of output torques generated by the energized armature coils from the output signals of said detecting means and the currents flowing through said detecting means, which currents are proportional to the currents flowing through the energized armature coils; and control circuit means for controlling said currents flowing through the energized armature coils so as to bring the combination into conformity with a value corresponding to a desired output torque from the motor.

3. An apparatus for removing torque ripples in a direct current motor including a magnet rotor, and polyphase stator armature coils having conductors attributable to torque generation and controllably energizable in response to angular positions of the magnet rotor, said apparatus comprising:

means for detecting magnetic fields and producing signals indicative of the detected magnetic fields, said means being fixed in phase with the conductors of the polyphase armature coils;

energization circuit means for equally energizing the armature coils with currents flowing therethrough during an interval in which the armature coils are energized at the same time;

operational circuit means for effecting an arithmetic operation to obtain a sum of the products of said output signals from said detecting means and the currents flowing through said detecting means which are proportional to the currents flowing through the energized armature coils, said sum being indicative of output torques generated by said armature coils; and control circuit means for controlling said currents flowing through the energized armature coils so as to bring the product into conformity with a value corresponding to a desired output torque from the motor.

* * * * *